(12) United States Patent
Goto et al.

(10) Patent No.: US 8,995,386 B2
(45) Date of Patent: Mar. 31, 2015

(54) WIRELESS TRANSMISSION APPARATUS, CONTROL PROGRAM, AND INTEGRATED CIRCUIT

(75) Inventors: Jungo Goto, Osaka (JP); Hiroki Takahashi, Osaka (JP); Osamu Nakamura, Osaka (JP); Kazunari Yokomakura, Osaka (JP); Yasuhiro Hamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 137 days.

(21) Appl. No.: 13/704,158

(22) PCT Filed: Apr. 22, 2011

(86) PCT No.: PCT/JP2011/059963
§ 371 (c)(1),
(2), (4) Date: Dec. 13, 2012

(87) PCT Pub. No.: WO2011/158560
PCT Pub. Date: Dec. 22, 2011

(65) Prior Publication Data
US 2013/0083767 A1    Apr. 4, 2013

(30) Foreign Application Priority Data
Jun. 16, 2010   (JP) .................................. 2010-137639

(51) Int. Cl.
*H04L 27/26*        (2006.01)
*H04W 72/04*        (2009.01)
(Continued)

(52) U.S. Cl.
CPC ........ *H04W 72/0453* (2013.01); *H04W 52/346* (2013.01); *H04W 52/42* (2013.01); *H04L 27/2636* (2013.01); *H04W 52/34* (2013.01); *Y02B 60/50* (2013.01)
USPC ............ 370/330; 370/328; 370/329; 455/573

(58) Field of Classification Search
None
See application file for complete search history.

(56) References Cited

U.S. PATENT DOCUMENTS 8,203,987 B2    6/2012  Ishii et al.
2005/0201180 A1   9/2005  Naguib et al.
(Continued)

FOREIGN PATENT DOCUMENTS

JP    2007-527677 A    9/2007
WO   WO 2008/123148 A1  10/2008

OTHER PUBLICATIONS

International Search Report issued in PCT/JP2011/059963 mailed Aug. 2, 2011, pp. 1.
(Continued)

*Primary Examiner* — Donald Mills
(74) *Attorney, Agent, or Firm* — Birch, Stewart, Kolasch & Birch, LLP

(57) ABSTRACT

In a communication system for performing transmission using non-contiguous frequency bands, transmit power control is performed in which minimum MPR is applied. A wireless transmission apparatus allocates at least one spectrum within a system band and performs transmit power control. The wireless transmission apparatus includes a dividing unit that divides a spectrum into non-contiguous clusters on the basis of band allocation information, a power control amount determining unit that determines transmission power for the spectrum or each of the clusters in accordance with a frequency band to which the spectrum or the cluster is allocated, a power control unit that performs transmit power control on the spectrum or each of the clusters by using the determined transmission power, and an allocating unit that allocates the spectrum or each of the clusters on which transmit power control has been performed to a frequency band on the basis of the band allocation information.

7 Claims, 20 Drawing Sheets

(51) Int. Cl.
*H04W 52/34* (2009.01)
*H04W 52/42* (2009.01)

(56) References Cited

U.S. PATENT DOCUMENTS

| | | |
|---|---|---|
| 2008/0200204 A1 | 8/2008 | Naguib et al. |
| 2010/0118805 A1 | 5/2010 | Ishii et al. |
| 2012/0088538 A1* | 4/2012 | Wallen et al. ............ 455/522 |
| 2012/0149427 A1* | 6/2012 | Perets et al. ............ 455/522 |
| 2012/0314666 A1* | 12/2012 | Pedersen et al. .......... 370/329 |
| 2013/0028214 A1* | 1/2013 | Imamura et al. .......... 370/329 |
| 2013/0058300 A1* | 3/2013 | Perets et al. ............ 370/329 |

OTHER PUBLICATIONS

Nokia Siemens Networks, Nokia, "Output power back-off aspects for clustered PUSCH," 3GPP TSG RAN WG1 Meeting #61, R1-102950, Montreal, Canada, May 10-14, 2010, pp. 1-3.

Panasonic, "Influence of UE power back-off to system performance for clustered PUSCH transmission," 3GPP TSG-RAN WG1 Meeting #60bis, R1-102033, Beijing, China, Apr. 12-16, 2010, pp. 1-5.

RAN4, "LS on simultaneous PUSCH and PUCCH and clustered SC-FDMA," 3GPP TSG-RAN WG1 Meeting #60bis, R1-101720, Beijing, China, Apr. 12-16, 2010, pp. 1-2.

* cited by examiner

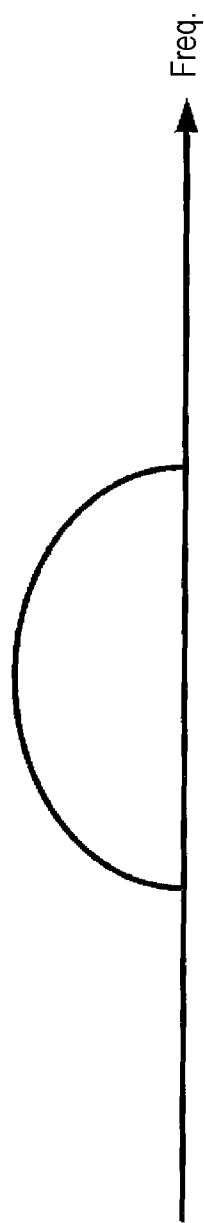

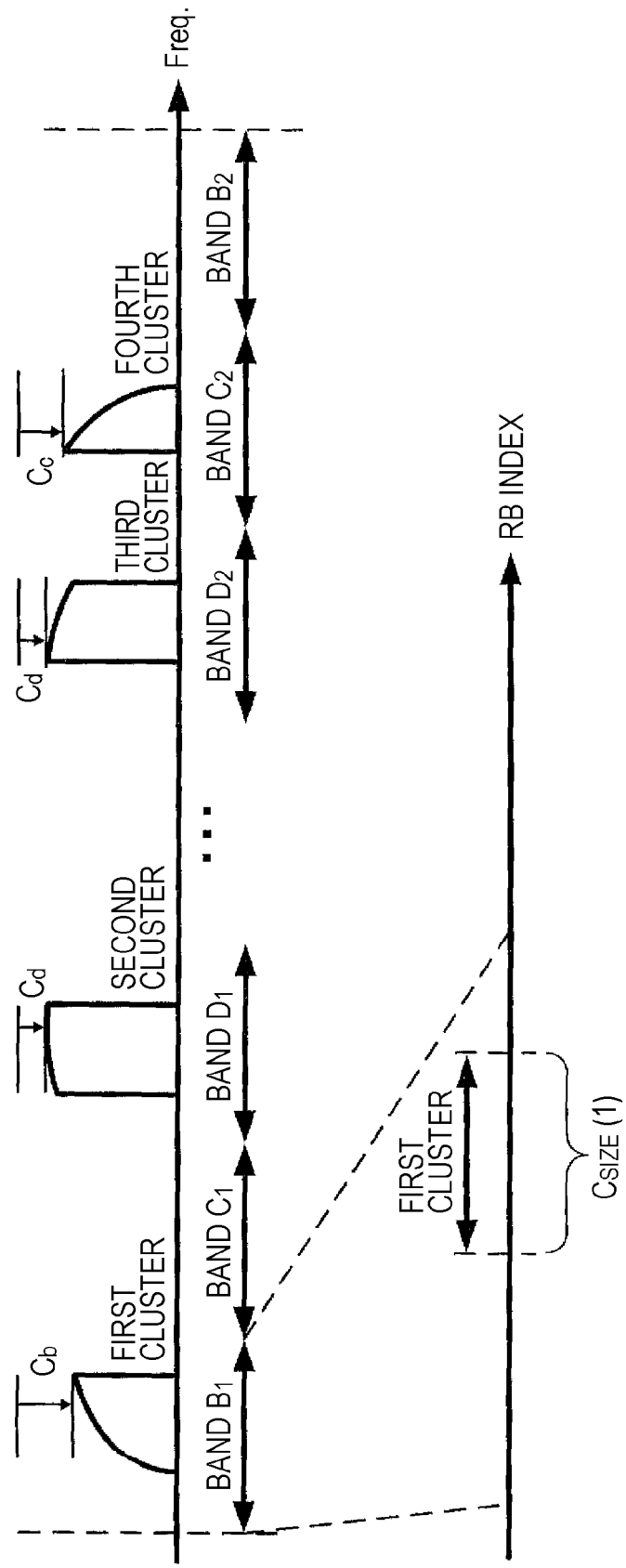

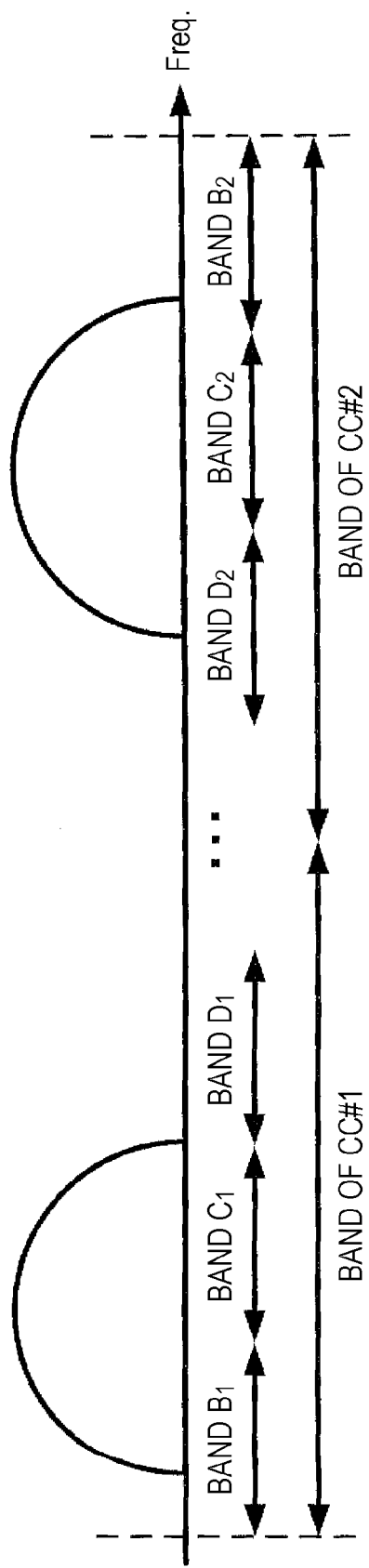

WIRELESS TRANSMISSION APPARATUS, CONTROL PROGRAM, AND INTEGRATED CIRCUIT

TECHNICAL FIELD

The present invention relates to a technology for controlling transmission power, and particularly to a wireless transmission apparatus, control program, and integrated circuit which are capable of preventing application of excessive MPR (Maximum Power Reduction).

BACKGROUND ART

The standardization of the LTE (Long Term Evolution) system, which is the 3.9th generation wireless communication system for mobile phones, has been substantially completed. Recently, the standardization of LTE-A (LTE-Advanced, also called IMT-A), which is a development of the LTE system and is a candidate for the 4th generation wireless communication system, has been progressing.

In uplink (communication from a mobile station to a base station) in the LTE system, DFT-S-OFDM (Discrete Fourier Transform Spread Orthogonal Frequency Division Multiplexing, also called SC-FDMA), in which spectra are allocated to contiguous frequency bands so as to have a good PAPR (Peak to Average Power Ratio) characteristic, is employed. Regarding the LTE-A system, a decision has been made to employ, in addition to DFT-S-OFDM, clustered DFT-S-OFDM (also called DSC (Dynamic Spectrum Control) or DFT-S-OFDM with SDC (Spectrum Division Control)), in which clusters generated by dividing a signal spectrum are allocated to non-contiguous frequency bands.

Furthermore, a decision has been made to increase the bandwidth to obtain a higher peak data rate, and also a decision has been made to use a system band used in the LTE system as a component carrier (CC, also called a Primary Component Carrier or Secondary Component Carrier) and perform carrier aggregation (CA) for simultaneous transmission on a plurality of CCs. For data transmission in an uplink using CA, N-times DFT-S-OFDM is employed. N-times DFT-S-OFDM is multi-carrier transmission in which frequency signals generated through DFT are assigned to respective CCs.

In clustered DFT-S-OFDM employed as an uplink transmission method for LTE-A, spectra are non-contiguously allocated within one CC and frequencies with a good channel are used, so that a frequency selection diversity gain is obtained. Accordingly, frequency utilization efficiency increases. On the other hand, in N-times DFT-S-OFDM, simultaneous transmission is performed using a plurality of CCs, in which spectra are allocated to non-contiguous frequency bands. Thus, broadband transmission can be realized, and a higher peak data rate can be obtained.

However, there is a problem with data transmission using such non-contiguous frequency bands in that a large amount of spurious emission is generated, particularly in a case where spectra are allocated to distant frequency bands (see NPL 1). An uplink in the LTE system is based on the assumption that data transmission is performed using a continuous frequency band, and thus transmit power control (TPC) is optimized for transmission using a continuous frequency band. The problem of spurious emission arises as a result of applying the method of transmit power control to clustered DFT-S-OFDM or N-times DFT-S-OFDM. Regarding TPC, methods suitable for data transmission using non-contiguous frequency bands are being studied. An example of the methods is a method for changing MPR (Maximum Power Reduction) in accordance with the spacing of frequencies when signals are allocated in the case of using non-contiguous frequency bands (see NPL 2).

CITATION LIST

Non Patent Literature

NPL 1: R1-101720, "LS on Simultaneous PUSCH and PUSCH and Clustered SC-FDMA", RAN4.

NPL 2: R1-102033, "Influence of UE power back-off to system performance for clustered PUSCH transmission", Panasonic

SUMMARY OF INVENTION

Technical Problem

However, the TPC which is currently being studied for solving the problem of spurious emission is based on only the consideration of spacing of non-contiguous frequency bands, without the consideration of frequency bands for allocation. Thus, it is likely that excessive MPR will be applied, and there is a problem of degradation of communication quality.

The present invention has been made in view of these circumstances, and an object of the invention is to provide a wireless transmission apparatus, control program, and integrated circuit which perform transmit power control for applying minimum MPR in a communication system for performing transmission using non-contiguous frequency bands.

Solution to Problem (1) To achieve the above-described object, the present invention takes the following measures. That is, a wireless transmission apparatus according to the present invention is a wireless transmission apparatus that allocates at least one spectrum within a system band and that performs transmit power control. The wireless transmission apparatus performs transmit power control in a different manner depending on a frequency band to which the spectrum is allocated within the system band.

In this way, transmit power control is performed in a different manner depending on a frequency band to which the spectrum is allocated within the system band. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(2) Also, the wireless transmission apparatus according to the present invention performs transmit power control in a different manner depending on a frequency band to which at least one of a plurality of spectrum portions, which are generated by dividing a spectrum, is allocated within the system band.

In this way, transmit power control is performed in a different manner depending on a frequency band to which at least one of a plurality of spectrum portions, which are generated by dividing a spectrum, is allocated within the system band. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(3) Also, the wireless transmission apparatus according to the present invention includes a dividing unit that divides a spectrum into non-contiguous clusters on the basis of band allocation information, a power control amount determining unit that determines transmission power for the spectrum or each of the clusters in accordance with a frequency band to which the spectrum or the cluster is allocated, a power control unit that performs transmit power control on the spectrum or each of the clusters by using the determined transmission power, and an allocating unit that allocates the spectrum or each of the clusters on which transmit power control has been performed to a frequency band on the basis of the band allocation information.

In this way, transmission power for the spectrum or each of the clusters is determined in accordance with a frequency band to which the spectrum or the cluster is allocated, transmit power control is performed on the spectrum or each of the clusters by using the determined transmission power, and the spectrum or each of the clusters on which transmit power control has been performed is allocated to a frequency band on the basis of the band allocation information. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(4) Also, the wireless transmission apparatus according to the present invention reduces transmission power by a greater amount the nearer the frequency band to which the spectrum is allocated is to an end of the system band.

In this way, transmission power is reduced by a greater amount the nearer the frequency band to which the spectrum is allocated is to an end of the system band. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(5) Also, in a case where at least two spectra are allocated within the system band, the wireless transmission apparatus according to the present invention reduces transmission power by a greater amount the larger a bandwidth between frequency bands to which the spectra are allocated is.

In this way, in a case where at least two spectra are allocated within the system band, transmission power is reduced by a greater amount the larger a bandwidth between frequency bands to which the spectra are allocated is. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(6) Also, in a case where a plurality of clusters generated by dividing a spectrum are non-contiguously allocated within a component carrier serving as a system band, the wireless transmission apparatus according to the present invention determines transmission power for each of frequency bands or resource blocks to which the clusters are allocated.

In this way, in a case where a plurality of clusters generated by dividing a spectrum are non-contiguously allocated within a component carrier serving as a system band, transmission power is determined for each of frequency bands or resource blocks to which the clusters are allocated. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(7) Also, in a case where carrier aggregation is performed in which a plurality of component carriers serving as a system band are used and where a plurality of clusters generated by dividing a spectrum are non-contiguously allocated, the wireless transmission apparatus according to the present invention reduces transmission power by a greater amount the nearer a frequency band to which one of the clusters is allocated is to a frequency band which is not included in the component carriers.

In this way, in a case where carrier aggregation is performed in which a plurality of component carriers serving as a system band are used and where a plurality of clusters generated by dividing a spectrum are non-contiguously allocated, transmission power is reduced by a greater amount the nearer a frequency band to which one of the clusters is allocated is to a frequency band which is not included in the component carriers. Thus, in carrier aggregation in which a plurality of component carriers are used for transmission, transmit power control can be performed by regarding adjacent component carriers as a system band. Accordingly, transmission power can be reduced by a minimum amount that is necessary to reduce spurious emission. As a result, at the time of transmission using non-contiguous frequency bands, degradation of communication quality caused by reducing transmission power more than necessary can be prevented.

(8) Also, in a case where carrier aggregation is performed in which a plurality of component carriers serving as a system band are used and where a spectrum is contiguously allocated, the wireless transmission apparatus according to the present invention reduces transmission power by a greater amount the nearer a frequency band to which the spectrum is allocated is to a frequency band which is not included in the component carriers.

In this way, in a case where carrier aggregation is performed in which a plurality of component carriers serving as a system band are used and where a spectrum is contiguously allocated, transmission power is reduced by a greater amount the nearer a frequency band to which the spectrum is allocated is to a frequency band which is not included in the component carriers. Thus, in carrier aggregation in which a plurality of component carriers are used for transmission, transmit power control can be performed by regarding adjacent component carriers as a system band. Accordingly, transmission power can be reduced by a minimum amount that is necessary to reduce spurious emission. As a result, at the time of transmission using non-contiguous frequency bands, degradation of communication quality caused by reducing transmission power more than necessary can be prevented.

(9) Also, in the wireless transmission apparatus according to the present invention, different amounts of reduction of transmission power are applied to an identical spectrum.

In this way, different amounts of reduction of transmission power are applied to an identical spectrum. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(10) Also, the wireless transmission apparatus according to the present invention performs the transmit power control on at least one of a data signal and a reference signal.

In this way, transmit power control is performed on at least one of a data signal and a reference signal. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(11) A control program according to the present invention is a control program for a wireless transmission apparatus that allocates at least one spectrum within a system band and that performs transmit power control. The control program includes commands to cause a computer to be able to read and execute a series of processes. The series of processes include a process of dividing a spectrum into non-contiguous clusters on the basis of band allocation information, a process of determining transmission power for the spectrum or each of the clusters in accordance with a frequency band to which the spectrum or the cluster is allocated, a process of performing transmit power control on the spectrum or each of the clusters by using the determined transmission power, a process of allocating the spectrum or each of the clusters on which transmit power control has been performed to a frequency band on the basis of the band allocation information, and a process of performing transmit power control in a different manner depending on a frequency band to which the spectrum is allocated within the system band.

In this way, transmission power for the spectrum or each of the clusters is determined in accordance with a frequency band to which the spectrum or the cluster is allocated, transmit power control is performed on the spectrum or each of the clusters by using the determined transmission power, and the spectrum or each of the clusters on which transmit power control has been performed is allocated to a frequency band on the basis of the band allocation information. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

(12) An integrated circuit according to the present invention is an integrated circuit that is mounted in a wireless transmission apparatus to cause the wireless transmission apparatus to implement a plurality of functions. The integrated circuit causes the wireless transmission apparatus to implement a series of functions. The series of functions include a function of dividing a spectrum into non-contiguous clusters on the basis of band allocation information, a function of determining transmission power for the spectrum or each of the clusters in accordance with a frequency band to which the spectrum or the cluster is allocated, a function of performing transmit power control on the spectrum or each of the clusters by using the determined transmission power, a function of allocating the spectrum or each of the clusters on which transmit power control has been performed to a frequency band on the basis of the band allocation information, and a function of performing transmit power control in a different manner depending on a frequency band to which the spectrum is allocated within the system band.

In this way, transmission power for the spectrum or each of the clusters is determined in accordance with a frequency band to which the spectrum or the cluster is allocated, transmit power control is performed on the spectrum or each of the clusters by using the determined transmission power, and the spectrum or each of the clusters on which transmit power control has been performed is allocated to a frequency band on the basis of the band allocation information. Thus, transmission power can be reduced by a minimum amount that is necessary to reduce spurious emission. As a result, at the time of transmission using non-contiguous frequency bands, degradation of communication quality caused by reducing transmission power more than necessary can be prevented.

Advantageous Effects of Invention

With the application of the present invention, application of excessive MPR (Maximum Power Reduction) can be prevented, and degradation of communication quality can be prevented.

BRIEF DESCRIPTION OF DRAWINGS

FIG. 3A is a diagram illustrating an example of allocating a signal in the frequency domain.

FIG. 8 is a diagram illustrating a case where transmit power control is performed in accordance with the allocation of clusters shown in Table 1 in the first embodiment of the present invention.

FIG. 16A is a diagram illustrating an example in which transmit power control using equation (3) and Table 1 is performed in the third embodiment of the present invention.

DESCRIPTION OF EMBODIMENTS

Hereinafter, embodiments of the present invention will be described with reference to the drawings. In the following embodiments, description will be given of uplink of transmission in which a mobile station serves as a transmission apparatus for performing data transmission and a base station serves as a reception apparatus for receiving data, but the embodiments are also applicable to downlink (transmission from a base station to a mobile station).

First Embodiment

Figure 1:
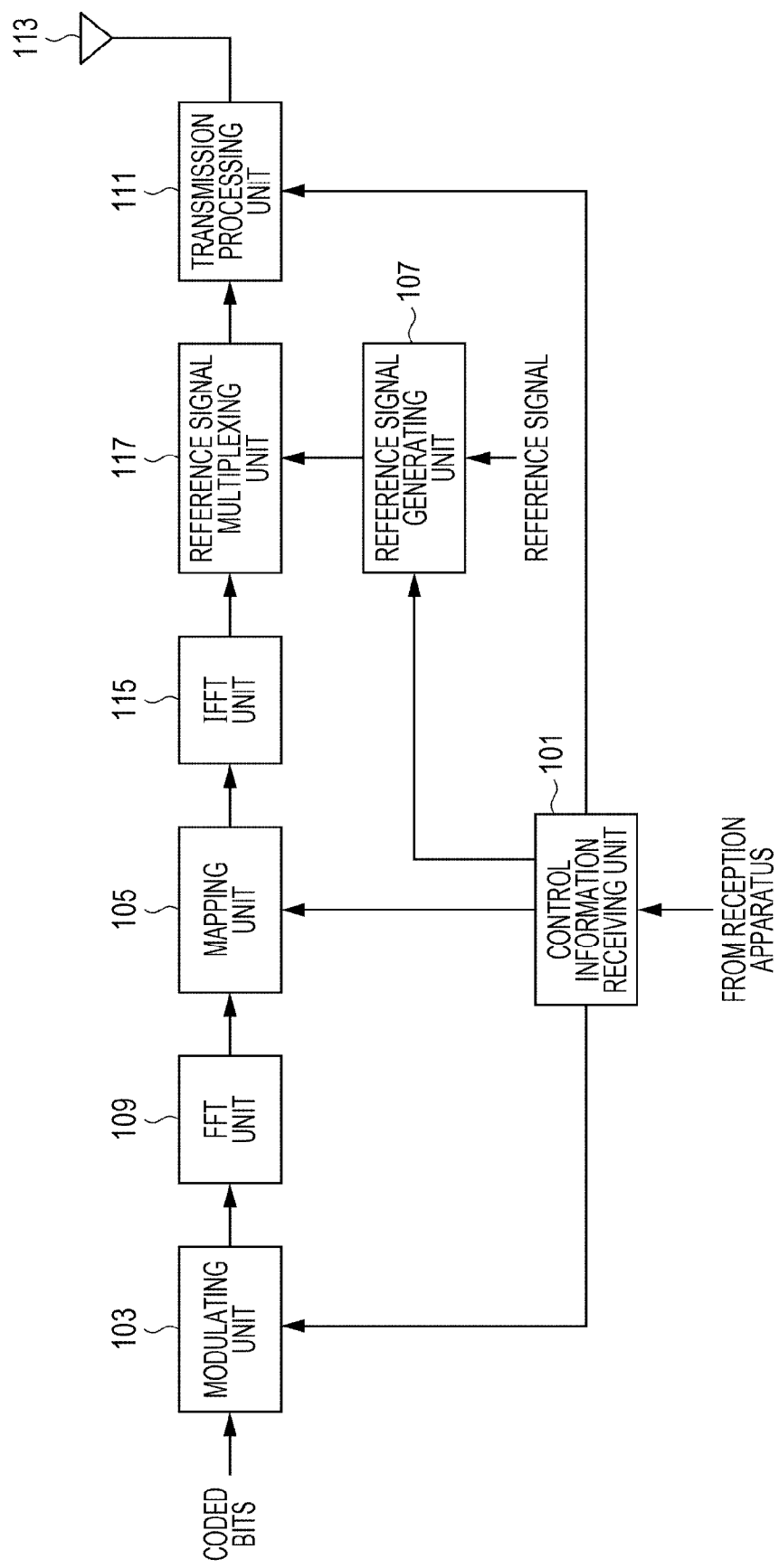
FIG. 1 is a block diagram illustrating an example of a transmission apparatus according to a first embodiment of the present invention.

FIG. 1 is a block diagram illustrating an example of a transmission apparatus according to a first embodiment of the present invention. Note that this is a minimum block diagram necessary for describing the present invention. In the transmission apparatus illustrated in FIG. 1, a control information receiving unit 101 receives control information notified from a reception apparatus. The control information includes band allocation information, a modulation scheme, and so forth used for data transmission. Also, the control information may include information about a coding rate used by an encoding unit, which is not illustrated in FIG. 1, and information about an amount of control for TPC. The control information receiving unit 101 inputs information about a modulation level included in the received control information to a modulating unit 103, and inputs the band allocation information to a mapping unit 105 and a reference signal generating unit 107. The modulating unit 103 receives coded bits on which error correcting coding has been performed, and performs modulation based on the modulation level notified from the control information receiving unit 101, among modulations such as QPSK (Quaternary Phase Shift Keying) and 16 QAM (16-ary Quadrature Amplitude Modulation). An FFT unit 109 transforms a modulation symbol output from the modulating unit 103 from data signals in the time domain to data signals in the frequency domain, and outputs the transformed data signals to a mapping unit 105.

Figure 2:
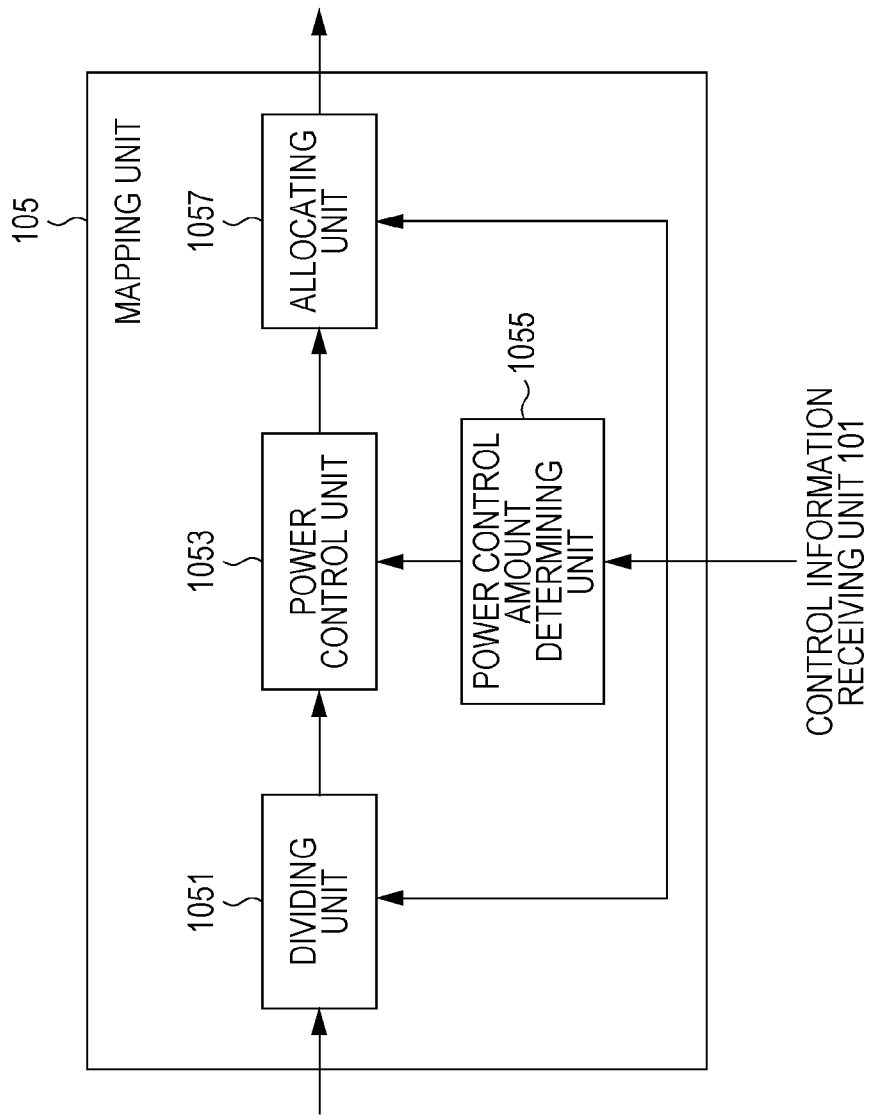
FIG. 2 is a block diagram illustrating an example of the configuration of a mapping unit 105 according to the first embodiment of the present invention.

FIG. 2 is a block diagram illustrating an example of the configuration of the mapping unit 105 according to the first embodiment of the present invention. The mapping unit 105 divides the signal in the frequency domain into clusters which are to be allocated to non-contiguous frequency bands, on the basis of the band allocation information received from the control information receiving unit 101. Note that, in the case of performing transmission by using a continuous frequency band in accordance with the band allocation information, a dividing unit 1051 inputs the signal input thereto to a power control unit 1053 as is. On the other hand, a power control amount determining unit 1055 determines transmission power for each cluster in accordance with the frequency band to which the cluster is allocated. A specific method for determining transmission power will be described below. In the power control unit 1053, the clusters generated by dividing the signal in the frequency domain are set to have transmission power determined by the power control amount determining unit 1055, and are output to an allocating unit 1057. The allocating unit 1057 allocates the clusters which have undergone transmit power control, on the basis of the band allocation information notified as control information.

Figure 3B:
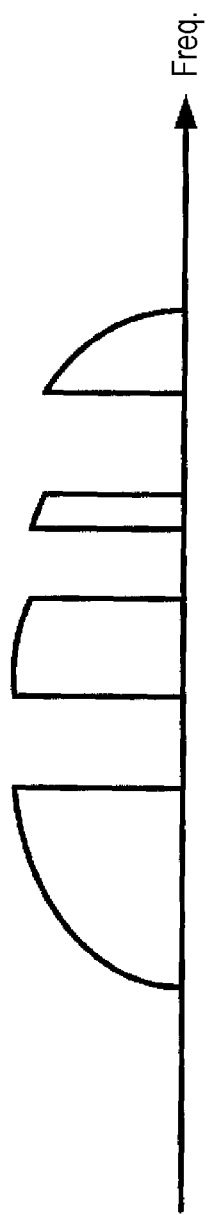
FIG. 3B is a diagram illustrating an example of allocating a signal in the frequency domain.

FIGS. 3A and 3B are diagrams illustrating examples of allocating a signal in the frequency domain. FIGS. 3A and 3B illustrate a case where contiguous band allocation is performed and a case where non-contiguous band allocation is performed, respectively. The allocation illustrated in FIG. 3A is performed in DFT-S-OFDM of LTE. The allocation illustrated in FIG. 3B corresponds to clustered DFT-S-OFDM employed in LTE-A. The signal on which band allocation has been performed in this way is output from the mapping unit 105. An IFFT unit 115 transforms the data signal in the frequency domain to a transmission signal in the time domain, and outputs the signal in the time domain to a reference signal multiplexing unit 117. The reference signal multiplexing unit 117 performs a process of multiplexing a reference signal output from the reference signal generating unit 107 with the transmission signal in the time domain. In this example, the reference signal is multiplexed in the time domain, but the reference signal may be multiplexed in the frequency domain.

Figure 4:
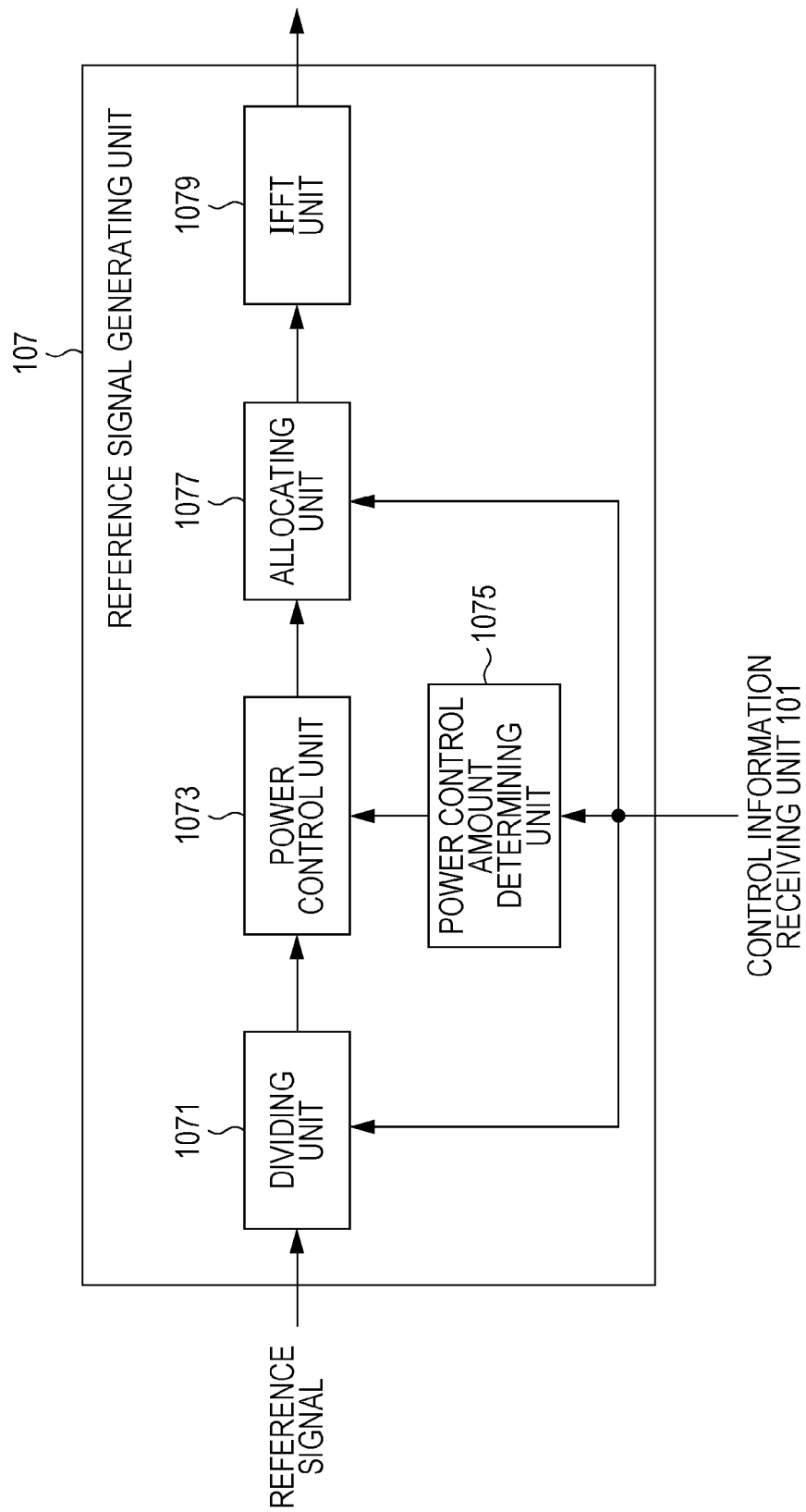
FIG. 4 is a block diagram illustrating an example of the configuration of a reference signal generating unit 107 according to the first embodiment of the present invention.

FIG. 4 is a block diagram illustrating an example of the configuration of the reference signal generating unit 107 according to the first embodiment of the present invention. The reference signal generating unit 107 performs, with a dividing unit 1071 to an allocating unit 1077, a process similar to the process performed on the data signal on an input reference signal which is known to the transmission and reception apparatuses. The signal output from the allocating unit 1077 is transformed from the signal in the frequency domain to a signal in the time domain by an IFFT unit 1079, and the signal in the time domain is output from the reference signal generating unit 107.

Referring back to FIG. 1, in a transmission processing unit 111, a CP (Cyclic Prefix) is inserted into the signal with which the reference signal has been multiplexed, and the signal is converted to an analog signal through D/A (Digital/Analog) conversion and is then up-converted to a radio frequency. After the up-conversion, the signal is amplified to have transmission power by a PA (Power Amplifier) and is then transmitted from a transmission antenna 113. The transmission apparatus in this example is described as a mobile station because uplink is discussed here. In downlink, a base station serves as a transmission apparatus. In a case where a base station serves as a transmission apparatus, the control information receiving unit 101 receives channel information as control information from a reception apparatus, and determines control information including band allocation. Also, a control information transmitting unit for notifying the reception apparatus of the control information including band allocation is added to FIG. 1, and the determined control information is used by the modulating unit 103 and the mapping unit 105.

Figure 5:
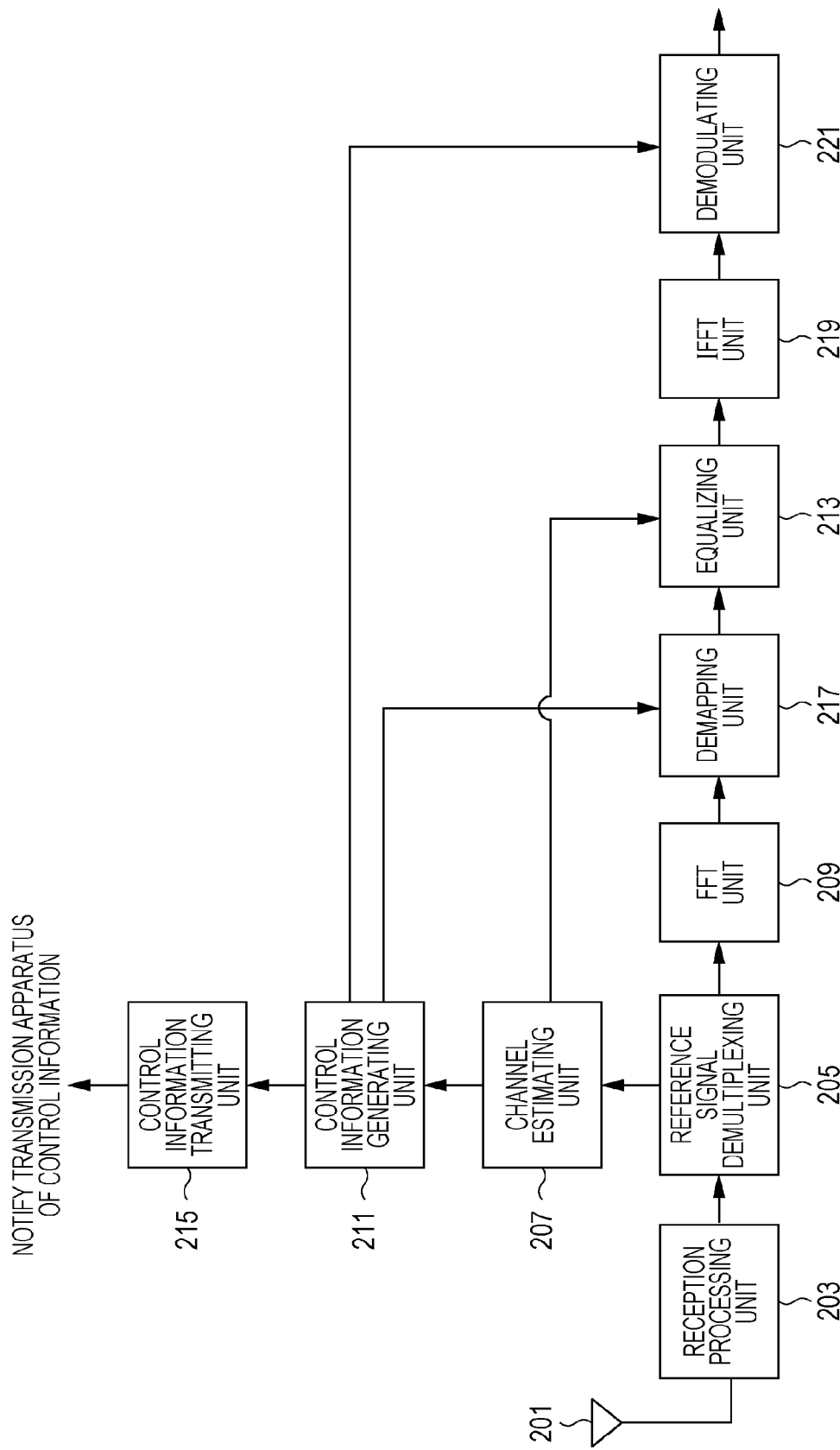
FIG. 5 is a block diagram illustrating an example configuration of a base station serving as a reception apparatus including one reception antenna 201 according to the first embodiment of the present invention.

FIG. 5 is a block diagram illustrating an example configuration of a base station serving as a reception apparatus including one reception antenna 201 according to the first embodiment of the present invention. Note that a plurality of reception antennas 201 may be provided. In the reception apparatus, the reception antenna 201 receives a signal from a transmission apparatus, and a reception processing unit 203 down-converts the signal to a baseband frequency, performs A/D conversion to convert the signal to a digital signal, and removes a cyclic prefix from the digital signal. The signal output from the reception processing unit 203 is demultiplexed into a reference signal and a data signal by a reference signal demultiplexing unit 205. The reference signal is output to a channel estimating unit 207, and the data signal is output to an FFT unit 209.

The channel estimating unit 207 estimates a frequency response of a channel by using a reference signal which is known to the transmission and reception apparatuses, and outputs an estimated channel characteristic to a control information generating unit 211 and an equalizing unit 213. The control information generating unit 211 determines band allocation (allocation information about frequency bands), a coding rate, a modulation scheme, and an amount of control for TPC, which are used when the transmission apparatus transmits data. A control information transmitting unit 215 converts control information, which includes the determined allocation information about frequency bands, coding rate, modulation scheme, and amount of control for TPC, to a signal to be fed back, and notifies the transmission apparatus of the control information via a modulating unit, a wireless unit, and a transmission antenna. Also, the control information generating unit 211 inputs the allocation information about frequency bands to a demapping unit 217. On the other hand, the data signal demultiplexed by the reference signal demultiplexing unit 205 is transformed from a signal in the time domain to a signal in the frequency domain by the FFT unit 209 and is then output to the demapping unit 217.

Figure 6:
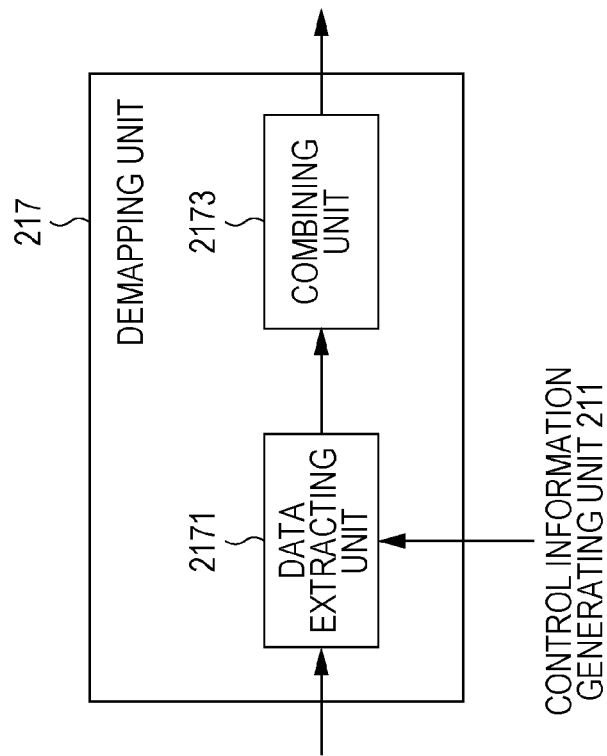
FIG. 6 is a block diagram illustrating an example configuration of a demapping unit 217 according to the first embodiment of the present invention.

FIG. 6 is a block diagram illustrating an example configuration of the demapping unit 217 according to the first embodiment of the present invention. As illustrated in FIG. 6, a data extracting unit 2171 extracts a reception signal from the reception signal in the frequency domain received from the FFT unit 209, on the basis of the band allocation information which is stored in the data extracting unit 2171 and which has been notified to the transmission apparatus. Here, if clusters allocated to non-contiguous frequency bands as in clustered DFT-S-OFDM are extracted, a combining unit 2173 combines the clusters and outputs a combined result. In a process of receiving a signal to which a continuous frequency band is allocated, as in DFT-S-OFDM, the combining unit 2173 performs nothing and outputs the signal as is.

The equalizing unit 213 performs an equalization process, in which distortion of a wireless channel is compensated, on the signal output from the demapping unit 217 by using the channel characteristic received from the channel estimating unit 207, and outputs the signal to an IFFT unit 219. Here, the equalization process includes multiplication of a weight based on MMSE (Minimum Mean Square Error) criterion, a ZF (Zero Forcing) weight, or the like. The signal input from the equalizing unit 213 is transformed by the IFFT unit 219 from a signal in the frequency domain to a signal in the time domain. A modulating unit 221 stores information about a modulation level which has been determined by the control information generating unit 211 on the basis of the channel characteristic and which has been notified to the transmission apparatus, performs demodulation of a symbol on the basis of the information about the modulation level, and obtains coded bits. With the above-described process, a process of receiving coded bits transmitted from the transmission apparatus is performed. The transmit power control in DFT-S-OFDM, in which a continuous frequency band is used for data transmission, is expressed by equation (1).

$$TX_{TOTAL}=\text{Min}\{P_{max}, TX_{OP}+TX_{CL}\} \quad (1)$$

In equation (1), $TX_{OP}$ represents open-loop TPC determined by the transmission apparatus, and includes the number of resource blocks to be used and a path loss. Here, a resource block (RB) is a group of twelve sub-carriers. $TX_{CL}$ represents closed-loop TPC notified with control information. $P_{max}$ represents the maximum transmission power of the transmission apparatus. Regarding Min, the smaller value in { } is selected.

When the transmit power control based on equation (1) is performed in a case where non-contiguous frequency bands are used as in clustered DFT-S-OFDM, the transmission power for each cluster is expressed by equation (2).

$$TX_C(i)=10 \log_{10}(TX'_{TOTAL} \times \{C_{SIZE}(i)/N_{RB}\}) \quad (2)$$

Equation (2) expresses the transmission power for the i-th cluster, $C_{SIZE}(i)$ represents the bandwidth of the i-th cluster, and $N_{RB}$ represents the total bandwidth of all the clusters. $TX'_{TOTAL}$ is expressed by the following equation.

$$TX'_{TOTAL}=10\hat{\,}(TX_{TOTAL}/10) \quad (2')$$

Note that A^B represents exponentiation in which A is a base and B is an exponent. Here, in the power control amount determining unit 1055 according to this embodiment, the transmission power for each cluster is determined by using equation (3).

$$TX_C(i)=10 \log_{10}(TX'_{TOTAL} \times \{C_{SIZE}(i)/N_{RB}\})-C_{POS}(i) \quad (3)$$

Note that $C_{POS}(i)$ is determined in accordance with the band allocation of the i-th cluster.

Figure 7:
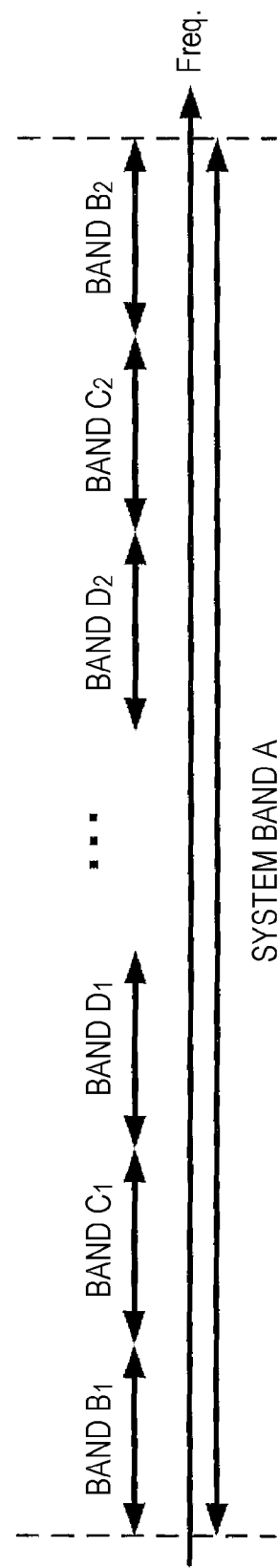
FIG. 7 is a diagram describing an example of a method for determining $C_{POS}(i)$ according to the first embodiment of the present invention.

FIG. 7 is a diagram describing an example of a method for determining $C_{POS}(i)$ according to the first embodiment of the present invention. In FIG. 7, it is assumed that $C_{POS}(i)$ is determined in accordance with a corresponding band within a system band A that can be used for data transmission, from an end of the system band, that is, band $B_1$, band $C_1$, band $D_1$, etc. In such a case, the nearer to an end of the system band a cluster is, the greater the problem of spurious emission caused by a third-order harmonic becomes. Thus, as an example of the method for determining $C_{POS}(i)$, $C_{POS}(i)$ is determined in accordance with Table 1. Note that $C_b > C_c > C_d$.

TABLE 1

| BAND | $C_{POS}(i)$ |
| --- | --- |
| BAND $B_1$, BAND $B_2$ | $C_b$ |
| BAND $C_1$, BAND $C_2$ | $C_c$ |
| BAND $D_1$, BAND $D_2$ | $C_d$ |

FIG. 8 is a diagram illustrating a case where transmit power control is performed in accordance with the allocation of clusters shown in Table 1 in the first embodiment of the present invention. Here, the cluster size $C_{SIZE}(i)$, which is the bandwidth of a cluster, is an integral multiple of an RB. In FIG. 8, a first cluster is allocated to band $B_1$, and thus the transmission power is reduced by $C_b$. Likewise, the transmission power for second and third clusters is reduced by $C_d$, and the transmission power for a fourth cluster is reduced by $C_c$. Here, in the frequency band near the center of the system band A, the influence of spurious emission is small and thus the power need not be reduced. For example, $C_d=0$ may be applied in band $D_1$ and band $D_2$. In a case where a cluster is allocated to span bands $B_1$ and $C_1$, $C_{POS}(i)$ may be determined in accordance with any of the minimum value, maximum value, and average value of RB indexes, or may be determined in accordance with the value of the RB index that is the nearest to an end of the system band. Also, in transmit power control performed in units of clusters, $C_{POS}(i)$ may be used to increase the transmission power ($C_{POS}(i)<0$), as well as to reduce the transmission power. For example, the transmission power may be reduced for a cluster which is allocated to an end of the system band, and the transmission power may be increased for a cluster which is allocated to a region other than an end of the system band.

The method for determining $C_{POS}(i)$ is not limited to the above-described example, and $C_{POS}(i)$ may be determined by using equation (4).

$$C_{POS}(i) = \text{Max}\{0, C_{PMAX} + (-1)^\alpha \times \beta \times RB_{idx}(i)\} \quad (4)$$

Note that, regarding Max $\{A, B\}$, the larger value among A and B is selected, and $C_{PMAX}$ represents the maximum value of reduction in power per cluster, and corresponds to $C_b$ in FIG. 8. $RB_{idx}(i)$ represents an RB index to which a cluster is allocated. In a case where a cluster is composed of a plurality of RBs, the RB index of the cluster may be determined in accordance with any of the minimum value, maximum value, and average value, or may be determined in accordance with the value of the RB index that is the nearest to an end of the system band. $\alpha$ is defined in Table 2.

TABLE 2

| VALUE OF RB INDEX | α |
|---|---|
| $RB_{idx}(i) \leq N_{TOTAL}/2$ | 1 |
| $N_{TOTAL}/2 < RB_{idx}(i)$ | 2 |

$N_{TOTAL}$ represents the number of RBs in the system band A. $\beta$ is a value expressed by equation (5).

$$\beta = |C_{PMAX} - MPR_{MIN}| / MPR_{RB} \quad (5)$$

Note that $MPR_{MIN}$ represents the minimum value of reduction in power per cluster, and $MPR_{RB}$ represents the number of RBs from the RB at an end of the system band for which the power needs to be reduced by $C_{PMAX}$ to the RB to which $MPR_{MIN}$ is applied. Thus, $\beta$ represents a difference in the amount of control of transmission power per RB.

Figure 9A:
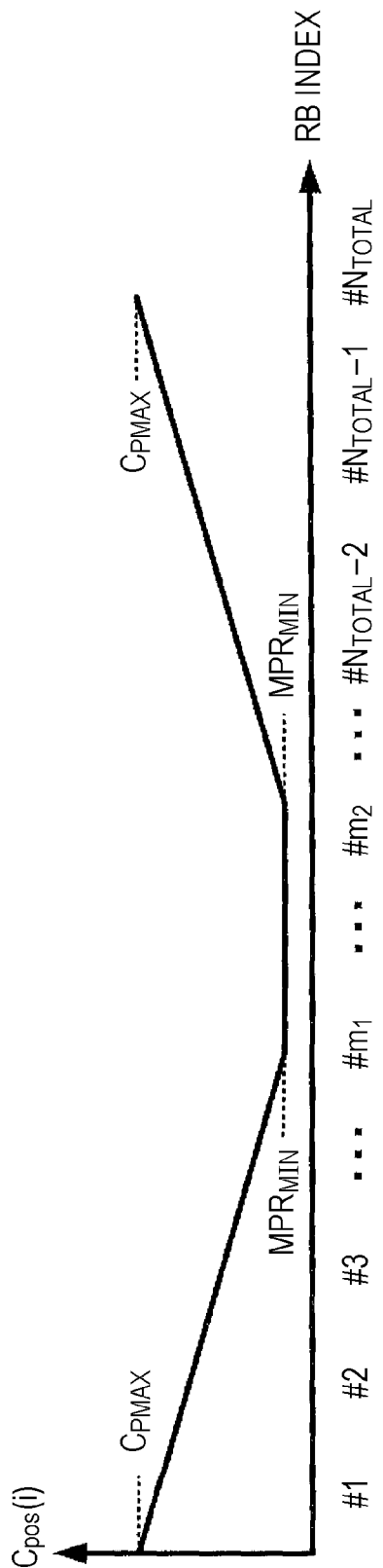
FIG. 9A is a diagram illustrating the transmit power control based on equation (4) according to the first embodiment of the present invention.
Figure 9B:
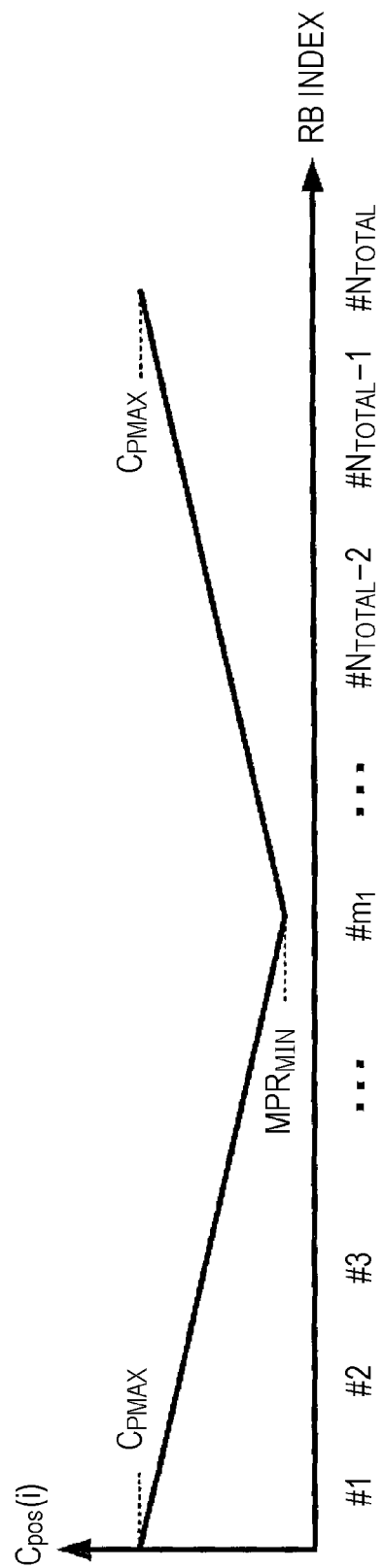
FIG. 9B is a diagram illustrating the transmit power control based on equation (4) according to the first embodiment of the present invention.

FIGS. 9A and 9B are diagrams illustrating the transmit power control based on equation (4) according to the first embodiment of the present invention. The power control amount determining unit 1055 performs control in the manner illustrated in FIGS. 9A and 9B, and $\beta$ represents an absolute value of the slope of $C_{POS}(i)$. In FIG. 9B, $m_1$ is $N_{TOTAL}/2$. In the case of the transmit power control based on equation (4), it is not necessary to use an identical $C_{POS}(i)$ for an entire cluster, but transmit power control may be performed in units of RBs. In the case of performing transmit power control in units of RBs, equation (6) is applied.

$$C_{POS}(i,k) = \text{Max}\{0, C_{PMAX} + (-1)^\alpha \times \beta \times RB_{idx}(I,k)\} \quad (6)$$

$C_{POS}(i, k)$ represents a value for controlling the transmission power for the k-th RB index in the i-th cluster, and $RB_{idx}(i, k)$ represents the k-th RB index in the i-th cluster.

In this embodiment, description has been given of an example of clustered DFT-S-OFDM in which a single-carrier spectrum is allocated to non-contiguous frequency bands, but this embodiment is also applicable to multi-carrier transmission, such as OFDM. Also, in this embodiment, description has been given of an example in which transmit power control is always performed in units of clusters. Alternatively, the transmit power control based on equation (1) may be applied, and, only in a limited case where the solution of equation (1) is higher than or equal to certain power, where a cluster is allocated to an end of a system band, or where the number of clusters is smaller than or equal to a certain number, the transmit power control based on equation (3) and any one of equations (4) and (6) may be applied. Also, in this embodiment, description has been given of an example of transmit power control performed in units of clusters in the case of non-contiguous band allocation within one CC. In the case of contiguous band allocation, the transmit power control according to this embodiment may be applied in units of spectrum portions, each being a part of a spectrum.

As described above, different manners of transmit power control are applied in accordance with allocation of clusters or an RB to which a cluster is allocated, and transmission power can be reduced by a minimum amount that is necessary to reduce spurious emission. Accordingly, at the time of transmission using non-contiguous frequency bands, degradation of communication quality caused by reducing transmission power more than necessary can be prevented.

Second Embodiment

In a second embodiment, description will be given of the case of using both CA, in which simultaneous transmission is performed using a plurality of CCs, and clustered DFT-S-OFDM, in which a single-carrier spectrum is allocated to non-contiguous frequency bands within one CC.

Figure 10:
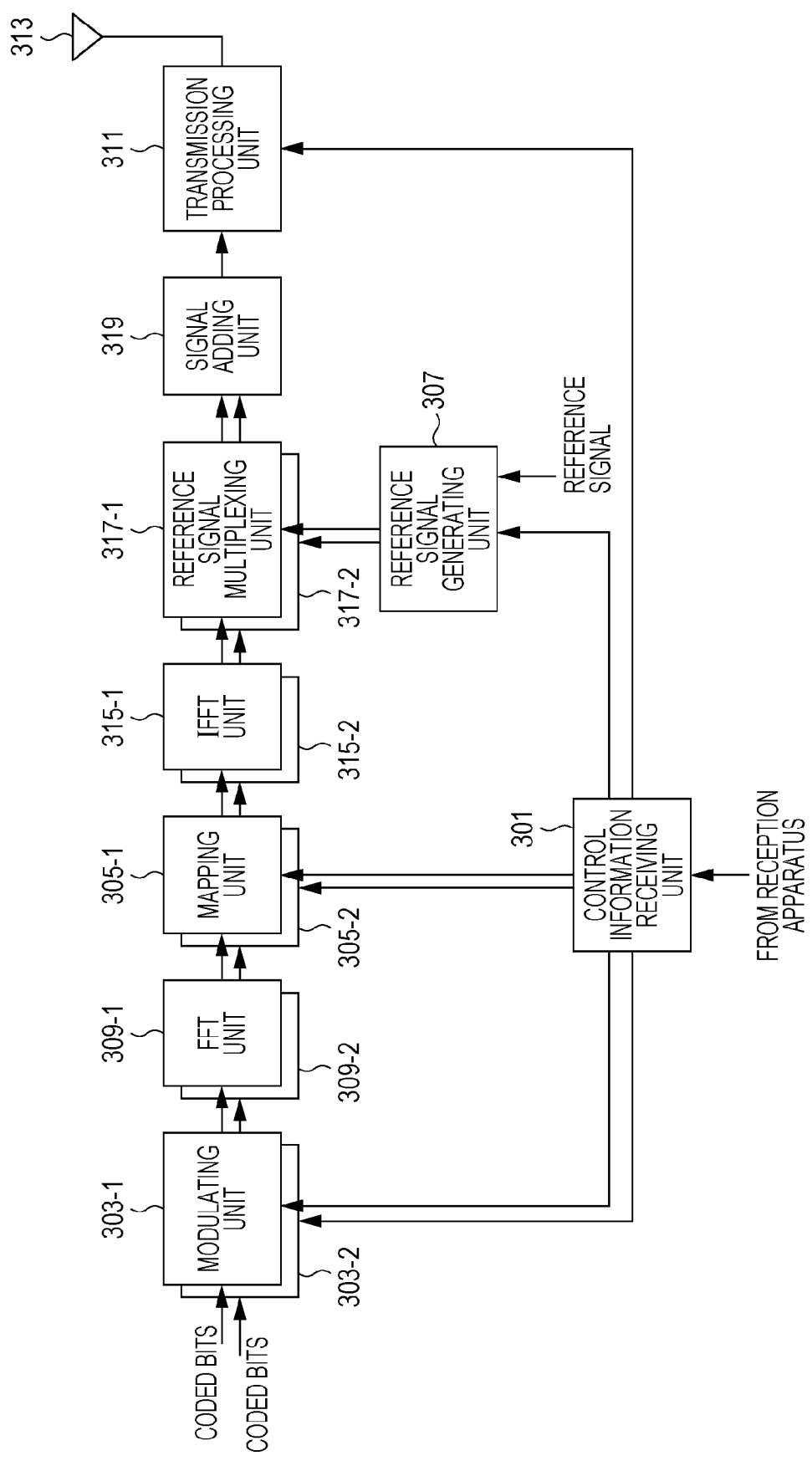
FIG. 10 is a block diagram illustrating an example configuration of a transmission apparatus according to a second embodiment of the present invention.

FIG. 10 is a block diagram illustrating an example configuration of a transmission apparatus according to a second embodiment of the present invention. The transmission apparatus illustrated in FIG. 10 has a configuration in which transmission is performed using a plurality of CCs. In this embodiment, description will be given of a case where the number of CCs used for transmission is two for simplicity, that is, CC#1 and CC#2 are used. It is assumed that coded data bits to be transmitted using CC#1 are input to a modulating unit 303-1, and that coded data bits to be transmitted using CC#2 are input to a modulating unit 303-2. The process performed by the modulating unit 303-1 to a reference signal multiplexing unit 317-1 and the process performed by the modulating unit 303-2 to a reference signal multiplexing unit 317-2 are similar to the process performed by the modulating unit 103 to the reference signal multiplexing unit 117 illustrated in FIG. 1, and thus the description thereof is omitted.

A signal in the time domain which is to be transmitted using CC#1 and with which a reference signal has been multiplexed is input to a signal adding unit 319 from the reference signal multiplexing unit 317-1, and a signal in the time domain which is to be transmitted using CC#2 and with which a reference signal has been multiplexed is input to the signal adding unit 319 from the reference signal multiplexing unit 317-2. The input signals for CC#1 and CC#2 are added together by the signal adding unit 319 after being multiplied by $e^{j2\pi ft}$, and a resulting signal undergoes, in a transmission processing unit 311, a process similar to the process performed in the transmission processing unit 111, and is transmitted by a transmission antenna 313. Note that "f" of $e^{j2\pi ft}$ is shifted by the frequency of each CC.

Figure 11:
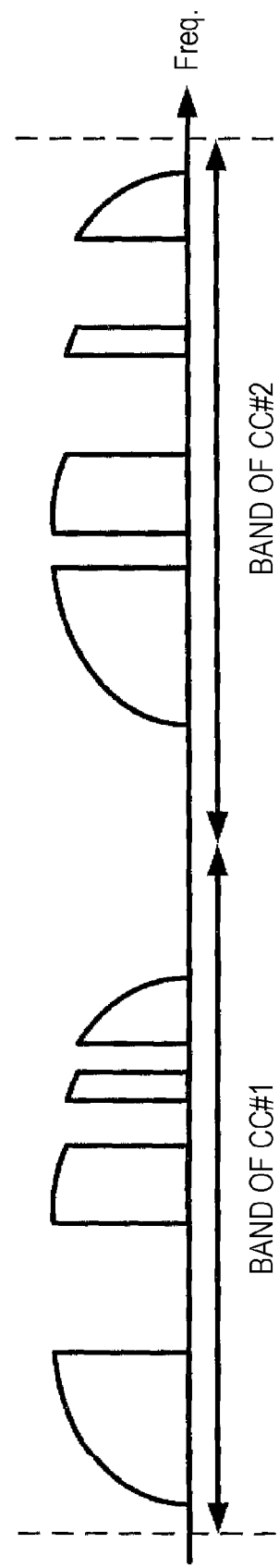
FIG. 11 is a diagram illustrating an example in which signals in the frequency domain are allocated according to the second embodiment of the present invention.

FIG. 11 is a diagram illustrating an example in which signals in the frequency domain are allocated according to the second embodiment of the present invention. In each CC, a signal in the frequency domain is divided into clusters, non-contiguous frequency bands are allocated thereto, and transmission is performed.

Figure 12:
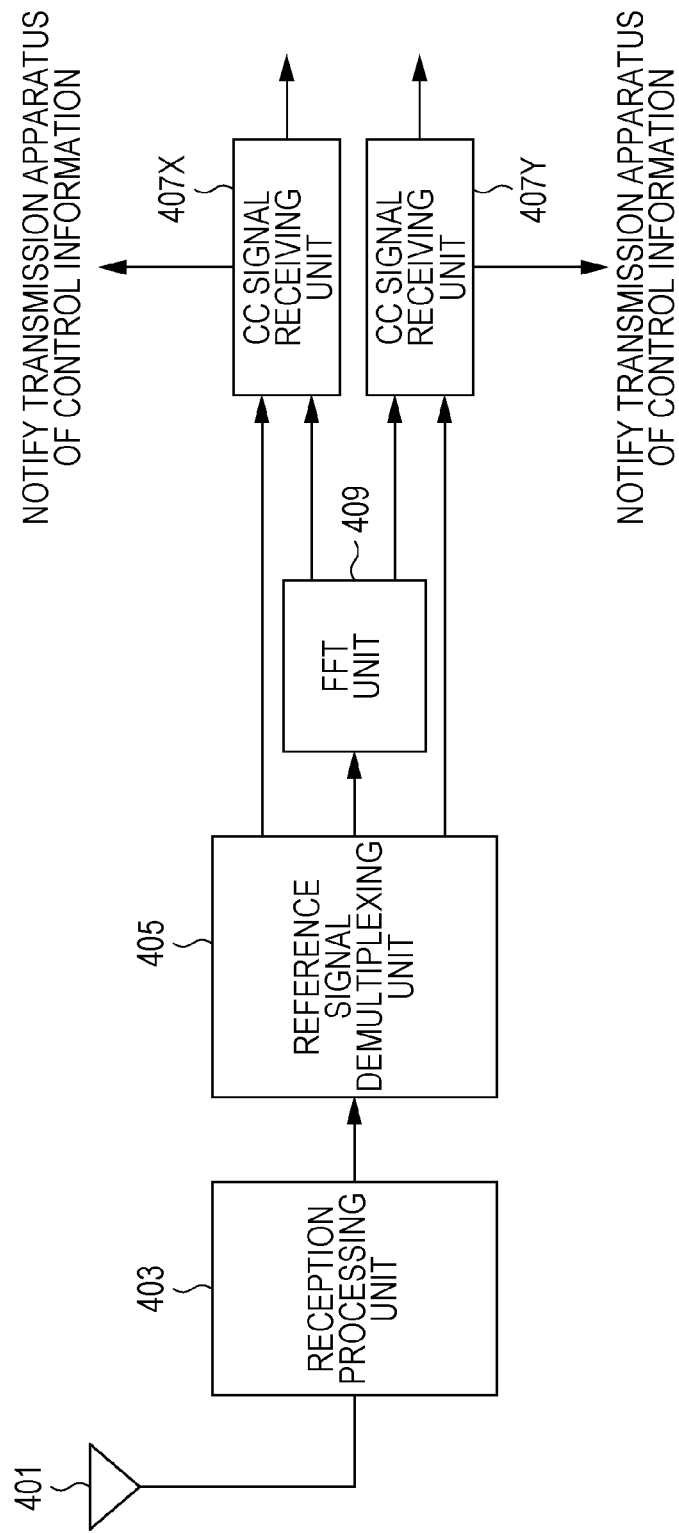
FIG. 12 is a block diagram illustrating an example configuration of a reception apparatus according to the second embodiment of the present invention.

FIG. 12 is a block diagram illustrating an example configuration of a reception apparatus according to the second embodiment of the present invention. In the reception apparatus, a reception antenna 401 receives signals allocated to a plurality of CCs, and a reception processing unit 403 performs a process similar to that performed by the reception processing unit 203. A reference signal demultiplexing unit 405 demultiplexes reference signals from the signals transmitted on the plurality of CCs and received from the reception processing unit 403, outputs the reference signal transmitted on CC#1 to a CC signal receiving unit 407X, and outputs the reference signal transmitted on CC#2 to a CC signal receiving unit 407Y. Data signals demultiplexed by the reference signal demultiplexing unit 405 are input to an FFT unit 409 and are transformed from signals in the time domain to signals in the frequency domain. Then, the data transmitted on CC#1 is output to the CC signal receiving unit 407X, and the data transmitted on CC#2 is output to the CC signal receiving unit 407Y.

Figure 13:
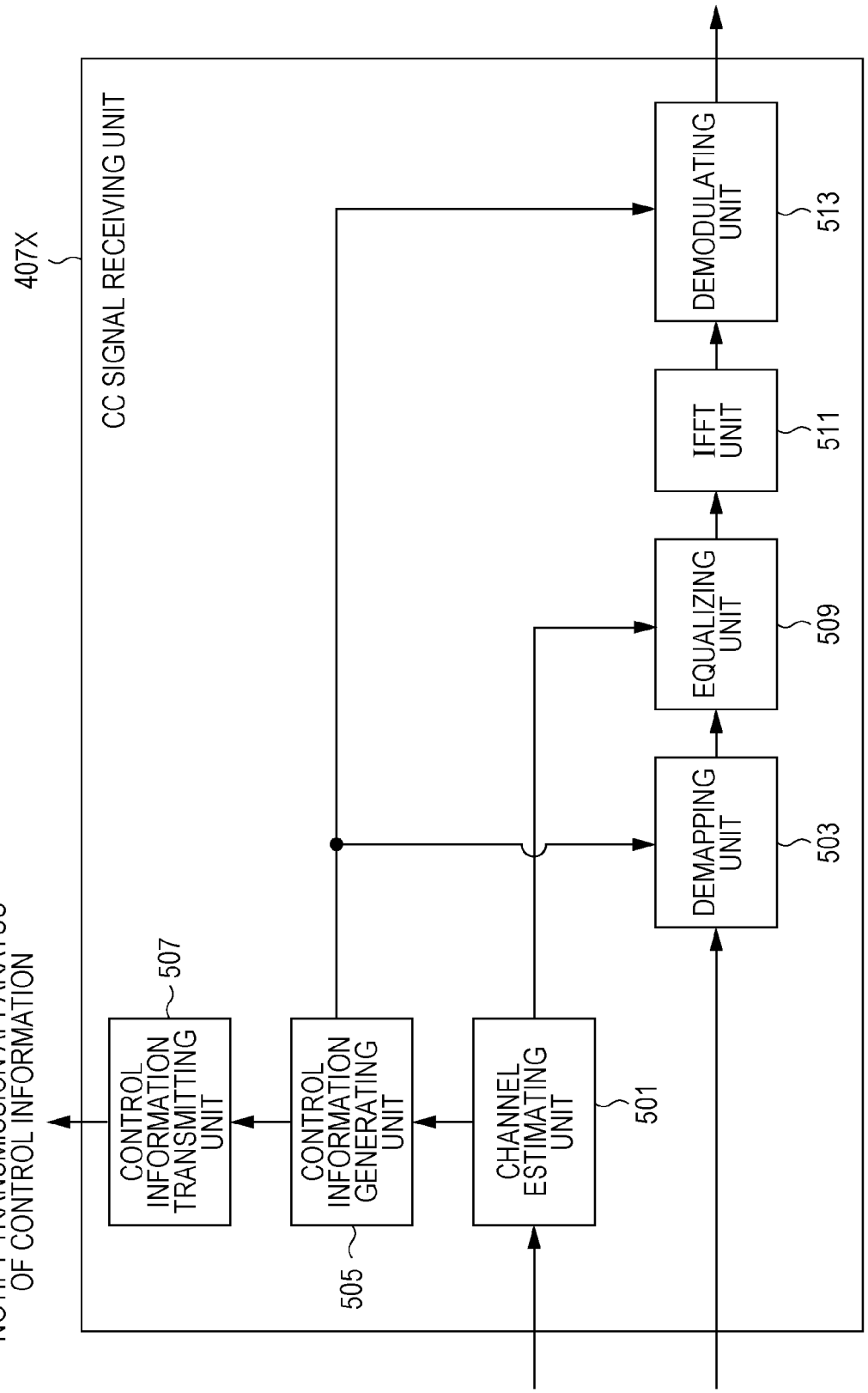
FIG. 13 is a block diagram illustrating an example configuration of a CC signal receiving unit 407X according to the second embodiment of the present invention.

FIG. 13 is a block diagram illustrating an example configuration of the CC signal receiving unit 407X according to the second embodiment of the present invention. The CC signal receiving unit 407X and the CC signal receiving unit 407Y perform a similar process, and thus only the CC signal receiving unit 407X is illustrated here. In the CC signal receiving unit 407X, the reference signal and data transmitted on CC#1 are input to a channel estimating unit 501 and a demapping unit 503, respectively. The channel estimating unit 501 to a control information transmitting unit 507 perform a process similar to the process performed by the channel estimating unit 207 to the control information transmitting unit 215. Also in the demapping unit 503 to a demodulating unit 513, a process similar to the process performed by the demapping unit 217 to the demodulating unit 221 is performed, and thereby demodulated data is obtained.

Figure 14:
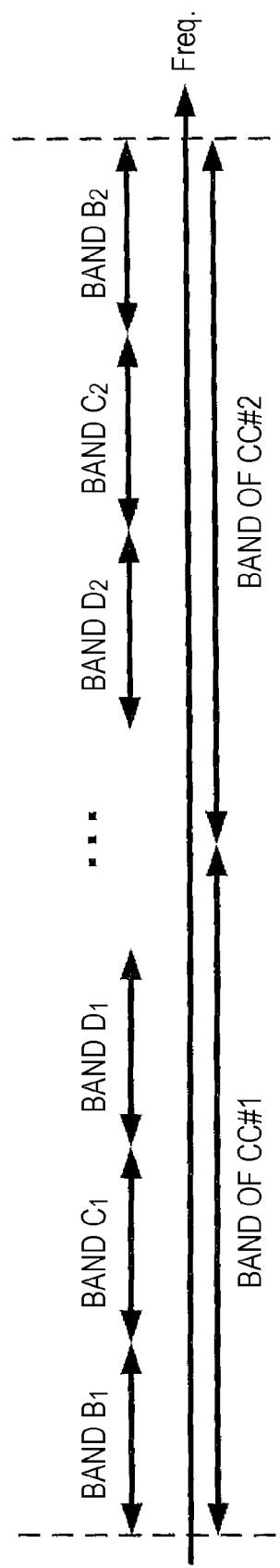
FIG. 14 is a diagram describing transmit power control performed in units of clusters or in units of RBs according to the second embodiment of the present invention.

FIG. 14 is a diagram describing transmit power control performed in units of clusters or in units of RBs according to the second embodiment of the present invention. In FIG. 14, frequency bands with which transmission can be performed are CC#1 and CC#2, and these CCs are adjacent to each other. In this case, spurious emission caused by a third-order harmonic to the outside of the frequency band of CC#1 or the frequency band of CC#2 is reduced by performing the transmit power control based on equation (3). Note that, in the case of performing transmission using a plurality of CCs, the method for determining $C_{POS}(i)$ is different from that in the first embodiment. In this embodiment, as illustrated in FIG. 14, a combination of the frequency band of CC#1 and the frequency band of CC#2 adjacent to each other is regarded as a system band, and $C_{POS}(i)$ is determined in the manner shown in Table 1 in accordance with a corresponding band, from an end of the system band, that is, band B, band C, band D, etc. Note that $C_b > C_c > C_d$.

The method for determining $C_{POS}(i)$ is not limited to the above-descried example, and $C_{POS}(i)$ may be determined by using equation (4). The RB index of a cluster in equation (4) may be determined, in a case where the cluster is composed of a plurality of RBs, in accordance with any of the minimum value, maximum value, and average value, or may be determined in accordance with the value of the RB index that is the nearest to an end of the system band. Also, in the case of the transmit power control based on equation (4), it is not necessary to use an identical $C_{POS}(i)$ for an entire cluster, but transmit power control may be performed in units of RBs in accordance with equation (6).

In this embodiment, description has been given of an example of clustered DFT-S-OFDM in which a single-carrier spectrum is allocated to non-contiguous frequency bands, but this embodiment is also applicable to multi-carrier transmission, such as OFDM. In the above-described case of CA in which a plurality of CCs are used for transmission, a combination of adjacent CCs is regarded as a system band, different manners of transmit power control are applied in accordance with allocation of clusters or an RB to which a cluster is allocated, and transmission power can be reduced by a minimum amount that is necessary to reduce spurious emission. Accordingly, at the time of transmission using non-contiguous frequency bands, degradation of communication quality caused by reducing transmission power more than necessary can be prevented.

Third Embodiment

In a third embodiment, description will be given of the case of N-times DFT-S-OFDM in which a plurality of CCs are used for transmission and a single-carrier spectrum is contiguously allocated within each CC. An example configuration of transmission and reception apparatuses according to this embodiment is similar to that of the second embodiment illustrated in FIGS. 10 and 12.

Figure 15:
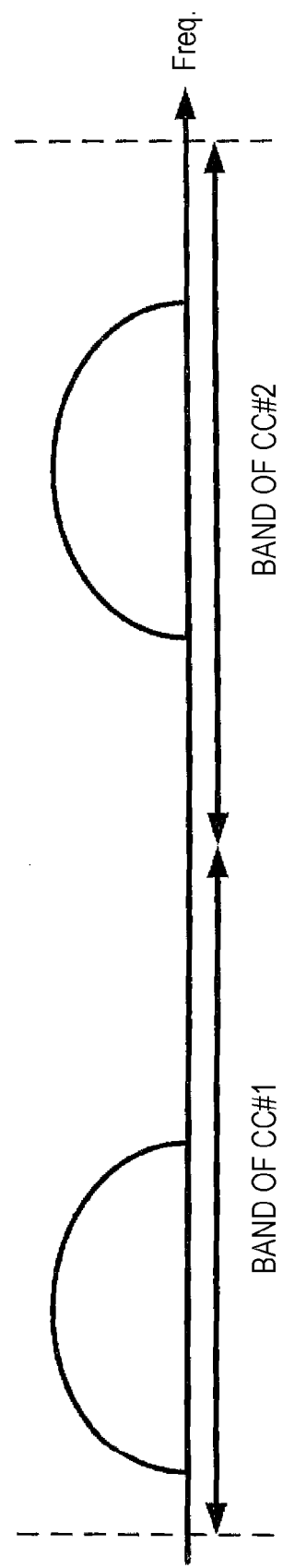
FIG. 15 is a diagram illustrating an example in which a transmission apparatus according to a third embodiment of the present invention allocates signals in the frequency domain.

FIG. 15 is a diagram illustrating an example in which the transmission apparatus according to the third embodiment of the present invention allocates signals in the frequency domain. The transmission apparatus performs single-carrier transmission within a CC in accordance with DFT-S-OFDM. However, a plurality of CCs are simultaneously used, and thus multi-carrier transmission is performed. Equation (3) is applied to the transmit power control according to this embodiment. However, since clustering is not performed in this embodiment, $C_{SIZE}(i)=N_{RB}$ is satisfied and equation (7) is applied.

$$TX_C(i)=10 \log_{10}(TX'_{TOTAL})-C_{POS}(i) \quad (7)$$

Also, as illustrated in FIG. 14, $C_{POS}(i)$ is determined by using Table (1) in accordance with a corresponding band, from an end of the system band, that is, band B, band C, band D, etc. The method for determining $C_{POS}(i)$ is not limited to the above-descried example, but $C_{POS}(i)$ may be determined by using equation (4). The RB index in equation (4) may be determined, in a case where a continuous signal of DFT-S-OFDM is composed of a plurality of RBs, in accordance with any of the minimum value, maximum value, and average value, or in accordance with the value of the RB index that is the nearest to an end of the system band. In the case of the transmit power control based on equation (4), it is not necessary to use an identical $C_{POS}(i)$ for the signal of DFT-S-OFDM, but transmit power control may be performed in units of RBs in accordance with equation (6).

Figure 16B:
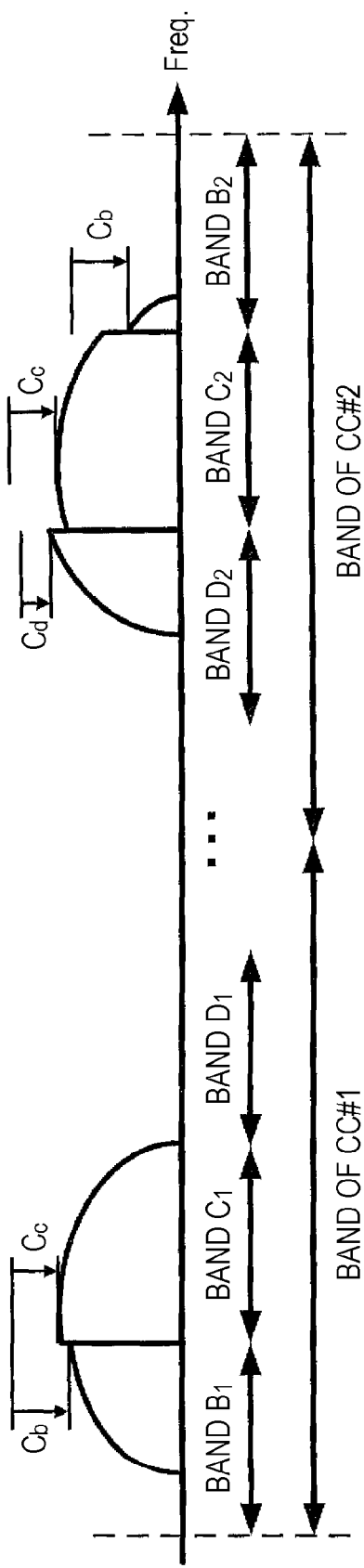
FIG. 16B is a diagram illustrating an example in which transmit power control using equation (3) and Table 1 is performed in the third embodiment of the present invention.

FIGS. 16A and 16B are diagrams illustrating an example in which transmit power control using equation (3) and Table 1 is performed in the third embodiment of the present invention. FIG. 16A illustrates a case where no transmit power control is performed, and FIG. 16B illustrates a case where transmit power control using equation (3) and Table 1 is performed. In this embodiment, $C_{POS}(i)$ is applied in units of spectrum portions, each being a part of a signal of DFT-S-OFDM, and thus uneven transmit power control is performed on the signal of DFT-S-OFDM which is contiguously allocated, as illustrated in FIG. 16B. Regarding the signal in the frequency domain allocated to the frequency band of CC#1, power is reduced by $C_{POS}(i)=C_b$ for the spectrum portion allocated to band $B_1$, and power is reduced by $C_{POS}(i)=C_c$ for the spectrum portion allocated to band $C_1$.

In this embodiment, different manners of transmit power control are applied in accordance with frequency bands for allocation, and any of $C_b$, $C_c$, and $C_d$ is applied to an identical spectrum in units of spectrum portions, as illustrated in FIG. 16B. However, this embodiment is not limited thereto. For example, instead of performing transmit power control in units of RBs in an identical spectrum, transmit power control may be performed on the RB at the end of the system band in contiguous allocation of a spectrum. As an example thereof, in a case where a spectrum is contiguously allocated to bands to which $C_b$ and $C_c$ are to be applied, $C_b$, which is the largest amount of reduction of power because $C_b>C_c$, may be uniformly applied to the continuous spectrum. Also, instead of transmit power control performed in units of spectrum portions, transmit power control in which $C_{POS}(i)$ is determined in units of RBs in accordance with equation (6) may be performed.

In the above-described case of CA in which a plurality of CCs are used for transmission, a combination of adjacent CCs is regarded as a system band, different transmission power is applied to individual RBs to which a continuous spectrum is allocated, and transmission power can be reduced by a minimum amount that is necessary to reduce spurious emission. Accordingly, at the time of transmission using non-contiguous frequency bands, degradation of communication quality caused by reducing transmission power more than necessary can be prevented.

Fourth Embodiment

In a fourth embodiment, description will be given of an example of performing transmit power control in accordance with frequency bands to which clusters are allocated and a bandwidth between clusters, in transmit power control for clustered DFT-S-OFDM in which clusters are allocated to non-contiguous frequency bands within one CC. In this embodiment, description will be given of the case of one CC, but this embodiment is also applicable to the case of CA. An example configuration of transmission and reception apparatuses according to this embodiment is similar to that illustrated in FIGS. 1 and 5 in the case of one CC, and is similar to that illustrated in FIGS. 10 and 12 in the case of CA.

Figure 17:
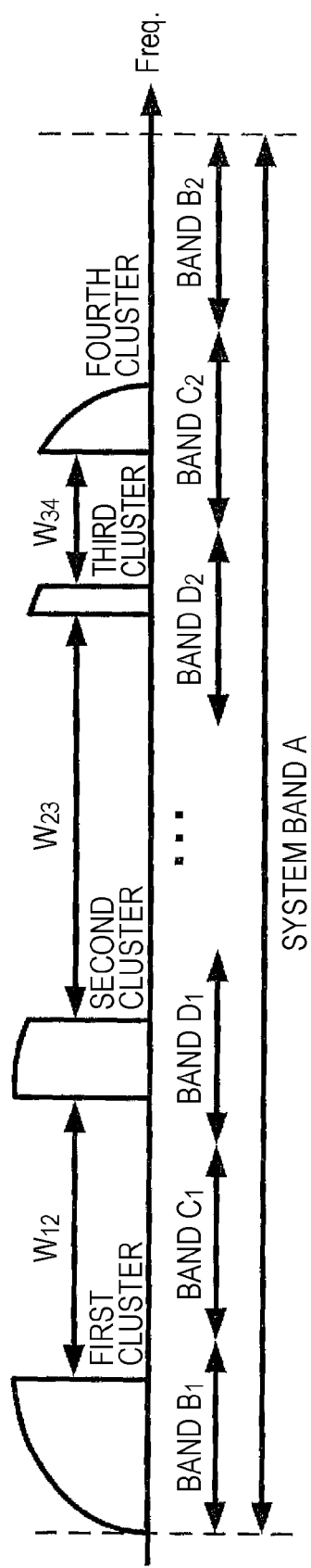
FIG. 17 is a diagram describing transmit power control according to a fourth embodiment of the present invention.

FIG. 17 is a diagram describing transmit power control according to the fourth embodiment of the present invention. In FIG. 17, first to fourth clusters are allocated, and the bandwidth between the i-th cluster and the j-th cluster is represented by $W_{ij}$. For example, the bandwidth between the first cluster and the second cluster is $W_{12}$. An influence of the problem of spurious emission caused by a third-order harmonic becomes greater in a case where a cluster is allocated at an end of a system band and where the bandwidth between clusters is large. Thus, transmit power control according to this embodiment is performed in accordance with, in addition to equation (3), equation (8) in which $C_W(i)$ is added to consider a bandwidth between clusters.

$$TX_c(i)=TX'_{TOTAL}\times\{C_{SIZE}(i)/N_{RB}\}-C_{POS}(i)+C_W(i) \quad (8)$$

Here, $C_{POS}(i)$ is determined by using Table 1 in accordance with a corresponding band, from an end of the system band, that is, band B, band C, band D, etc. as illustrated in FIG. 17. Also, $C_w(i)$ is determined by using Table 3 in accordance with min($W_{ij}$), which is the smallest value among the bandwidths $W_{ij}$ between the i-th cluster and another cluster.

TABLE 3

| min ($W_{ij}$) | $C_W(i)$ |
|---|---|
| $N_{TOTAL}\times\gamma_1$ | $C_{W1}$ |
| $N_{TOTAL}\times\gamma_2$ | $C_{W2}$ |
| $N_{TOTAL}\times\gamma_3$ | $C_{W3}$ |

Note that $C_W(i)$ always satisfies $|C_{POS}(i)|>|C_W(i)|$, and an amount of control of transmission power is determined to satisfy $C_{W1}=0<C_{W2}<C_{W3}$. $\gamma_1$, $\gamma_2$, and $\gamma_3$ are thresholds for performing transmit power control in accordance with the bandwidth between clusters, and an influence of the problem of spurious emission becomes greater in a case where the bandwidth between clusters is large, and thus $1>\gamma_1>\gamma_2>\gamma_3>0$ is satisfied. For example, when $\gamma_1=0.5$ and $\gamma_2=0.3$, transmission power is reduced by $(C_{POS}(i)-C_{W1})$ in a case where the bandwidth between clusters is 50% or more of the system band, and transmission power is reduced by $(C_{POS}(i)-C_{W2})$ in a case where the bandwidth between clusters is 30% or more and less than half of the system band. Also, min ($W_{ij}$) is the minimum value of $W_{ij}$ in a case where j is a certain cluster which satisfies j≠i. For example, in a case where $W_{13}>W_{23}>W_{34}$ is satisfied, as illustrated in FIG. 17, min $(W_{3j})=W_{34}$. In such a case where a cluster is allocated to an end of the system band and where the bandwidth between clusters is larger, control is performed to reduce more transmission power.

The method for determining $C_{POS}(i)$ using equation (8) is not limited to the method using Table 1, and equation (4) may be applied. The RB index of a cluster in equation (4) may be determined, in a case where the cluster is composed of a plurality of RBs, in accordance with any of the minimum value, maximum value, and average value, or may be determined in accordance with the value of the RB index that is the nearest to an end of the system band. Also, in the case of the transmit power control based on equation (4), it is not necessary to use an identical $C_{POS}(i)$ for an entire cluster, but transmit power control may be performed in units of RBs in accordance with equation (6).

In this embodiment, description has been given of an example of clustered DFT-S-OFDM in which a single-carrier spectrum is allocated to non-contiguous frequency bands, but this embodiment is also applicable to multi-carrier transmission, such as OFDM. Also, description has been given of an embodiment regarding one CC, but the embodiment is also applicable to CA in which a plurality of CCs are used for transmission. The transmit power control according to this embodiment may be performed by regarding a plurality of adjacent CCs as a system band.

As described above, different manners of transmit power control are applied in accordance with allocation of clusters or an RB to which a cluster is applied, and the bandwidth between clusters, and transmission power can be reduced by a minimum amount that is necessary to reduce spurious emission. Accordingly, at the time of transmission using non-contiguous frequency bands, degradation of communication quality caused by reducing transmission power more than necessary can be prevented.

A program which operates in a mobile station apparatus and a base station apparatus according to the present invention is a program (program causing a computer to function) which controls a CPU or the like so as to realize the functions of the above-described embodiments according to the present invention. The information dealt with by these apparatuses is temporarily stored in a RAM at the time of processing thereof, and is then stored in various types of ROM or HDD, and is read out, corrected, or written by the CPU if necessary. A recording medium for storing the program may be any of a semiconductor medium (for example, ROM, nonvolatile memory card, etc.), an optical recording medium (for example, DVD, MO, MD, CD, BD, etc.), and a magnetic recording medium (for example, magnetic tape, flexible disk, etc.).

The functions of the above-described embodiments may be realized through execution of a loaded program, and the functions of the present invention may be realized through processing which is performed in conjunction with an operating system or another application program or the like in response to an instruction of the program. In the case of circulating the program on the market, the program may be stored in portable recording media so as to be circulated, or the program may be transferred to a server computer which is connected via a network, such as the Internet. In this case, a storage device of the server computer is included in the present invention.

Furthermore, part or whole of a mobile station apparatus and a base station apparatus according to the above-described embodiments may be realized by an LSI, which is typically an integrated circuit. The individual functional blocks of each of the mobile station apparatus and the base station apparatus may be individually mounted on chips, or some or all of them may be integrated to be mounted on a chip. A method for integration may be realized by a dedicated circuit or a general-purpose processor, as well as an LSI. In a case where the progress of semiconductor technologies produces an integration technology which replaces an LSI, an integrated circuit according to the technology can be used.

The embodiments of the present invention have been described in detail with reference to the drawings. Specific configurations are not limited to these embodiments, and design within a scope of the gist of the present invention is included in the claims.

REFERENCE SIGNS LIST 101 control information receiving unit
103 modulating unit
105 mapping unit
107 reference signal generating unit
109 FFT unit
111 transmission processing unit
113 transmission antenna
115 IFFT unit
117 reference signal multiplexing unit
201 reception antenna
203 reception processing unit
205 reference signal demultiplexing unit
207 channel estimating unit
209 FFT unit
211 control information generating unit
213 equalizing unit
215 control information transmitting unit
217 demapping unit
219 IFFT unit
221 demodulating unit
301 control information receiving unit
303-1, 303-2 modulating unit
305-1, 305-2 mapping unit
307 reference signal generating unit
309-1, 309-2 FFT unit
311 transmission processing unit
313 transmission antenna
315-1, 315-2 IFFT unit
317-1, 317-2 reference signal multiplexing unit
319 signal adding unit
401 reception antenna
403 reception processing unit
405 reference signal demultiplexing unit
407X, 407Y CC signal receiving unit
409 FFT unit
501 channel estimating unit
503 demapping unit
505 control information generating unit
507 control information transmitting unit
509 equalizing unit
511 IFFT unit
513 demodulating unit
1051 dividing unit
1053 power control unit
1055 power control amount determining unit
1057 allocating unit
1071 dividing unit
1073 power control unit
1075 power control amount determining unit
1077 allocating unit
1079 IFFT unit
2171 data extracting unit
2173 combining unit

The invention claimed is:

1. A wireless transmission apparatus comprising:
a power control unit configured to control transmission power for transmitting a Discrete Fourier Transform-spread-OFDM (DFT-S-OFDM) signal; and
a power control amount determining unit configured to set a reduction amount of the transmission power, wherein
the power control amount determining unit is configured to set the reduction amount of the transmission power using a minimum value of resource blocks (RB) indexes used for one or more component carriers (CCs), each of the CCs being allocated by the DFT-S-OFDM signal, and
the power control unit is configured to control the transmission power using the reduction amount of the transmission power.

2. The wireless transmission apparatus according to claim 1, comprising:
an allocating unit configured to allocate the DFT-S-OFDM signal to a plurality of contiguous subcarriers using allocation information, wherein
the allocation information includes one of a first allocation information and a second allocation information, the first allocation information indicating to allocate the plurality of contiguous subcarriers to form a single cluster of subcarriers and the second allocation information indicating to non-contiguous allocate the plurality of contiguous subcarriers in at least a first cluster and a second cluster where the first cluster includes a first portion of the plurality of contiguous subcarriers allocated to form the first cluster and where the second cluster includes a second portion of the plurality of contiguous subcarriers allocated to form the second cluster.

3. A wireless transmission apparatus, comprising:
a power control unit configured to control transmission power for transmitting a Discrete Fourier Transform-spread-OFDM (DFT-S-OFDM) signal; and
a power control amount determining unit configured to set a reduction amount of the transmission power, wherein
the power control amount determining unit is configured to set the reduction amount of the transmission power using a maximum value of resource blocks (RB) indexes used for a system band, the system band being comprised of two or more contiguous component carriers (CCs) and each of the CCs being allocated by the DFT-S-OFDM signal, and
the power control unit is configured to control the transmission power using the reduction amount of the transmission power.

4. The wireless transmission apparatus according to claim 3, further comprising:
an allocating unit configured to allocate the DFT-S-OFDM signal to a plurality of contiguous subcarriers using allocation information, wherein
the allocation information includes one of a first allocation information and a second allocation information, the first allocation information indicating to allocate the plurality of contiguous subcarriers to form a single cluster of subcarriers and the second allocation information indicating to non-contiguous allocate the plurality of contiguous subcarriers in at least a first cluster and a second cluster where the first cluster includes a first portion of the plurality of contiguous subcarriers allocated to form the first cluster and where the second cluster includes a second portion of the plurality of contiguous subcarriers allocated to form the second cluster.

5. The wireless transmission apparatus according to claim 3, wherein the power control amount determining unit is configured to set the reduction amount of the transmission power for each of the CCs, the CCs including at least a first CC and a second CC, wherein
a reduction amount of the transmission power to be set for the first CC is equal to a reduction amount of the transmission power to be set for second CC.

6. A wireless transmission method, comprising:
controlling transmission power for transmitting a Discrete Fourier Transform-spread-OFDM (DFT-S-OFDM) signal; and
setting a reduction amount of the transmission power, wherein
setting the reduction amount of the transmission power using a minimum value of resource blocks (RB) indexes used for one or more component carriers (CCs), each of the CCs being allocated by the DFT-S-OFDM signal, and
controlling the transmission power using the reduction amount of the transmission power.

7. A wireless transmission method, comprising:
controlling transmission power for transmitting a Discrete Fourier Transform-spread-OFDM (DFT-S-OFDM) signal; and
setting a reduction amount of the transmission power, wherein
setting the reduction amount of the transmission power using a maximum value of resource blocks (RB) indexes used for a system band, the system band being comprised of two or more contiguous component carriers (CCs) and each of the CCs being allocated by the DFT-S-OFDM signal, and
controlling the transmission power using the reduction amount of the transmission power.

* * * * *